(12) United States Patent
Park et al.

(10) Patent No.: US 9,077,946 B2
(45) Date of Patent: Jul. 7, 2015

(54) STREAMING CONTENT MANAGEMENT APPARATUS AND METHOD

(75) Inventors: Sung Jin Park, Anyang-si (KR); Won Sang Kwon, Seoul (KR); Jin Guk Jeong, Yongin-si (KR); Yun Je Oh, Yongin-si (KR); Joon Oo Kim, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2205 days.

(21) Appl. No.: 11/690,182

(22) Filed: Mar. 23, 2007

(65) Prior Publication Data

US 2008/0060029 A1 Mar. 6, 2008

(30) Foreign Application Priority Data

Sep. 1, 2006 (KR) .................. 10-2006-84312

(51) Int. Cl.
| | |
|---|---|
| H04N 9/80 | (2006.01) |
| H04N 5/76 | (2006.01) |
| G11B 27/034 | (2006.01) |
| G11B 27/32 | (2006.01) |
| H04N 21/4147 | (2011.01) |
| H04N 21/432 | (2011.01) |
| H04N 21/433 | (2011.01) |
| H04N 21/44 | (2011.01) |
| H04N 5/775 | (2006.01) |
| H04N 9/877 | (2006.01) |

(52) U.S. Cl.
CPC ............... *H04N 5/76* (2013.01); *G11B 27/034* (2013.01); *G11B 27/322* (2013.01); *H04N 5/775* (2013.01); *H04N 9/877* (2013.01); *H04N 21/4147* (2013.01); *H04N 21/4325* (2013.01); *H04N 21/4334* (2013.01); *H04N 21/44008* (2013.01)

(58) Field of Classification Search
None
See application file for complete search history.

(56) References Cited

U.S. PATENT DOCUMENTS

| | | | | |
|---|---|---|---|---|
| 6,535,920 | B1 * | 3/2003 | Parry et al. ..................... | 709/231 |
| 6,553,180 | B1 * | 4/2003 | Kikuchi et al. ................. | 386/241 |
| 2001/0010753 | A1 * | 8/2001 | Ando et al. ..................... | 386/65 |
| 2006/0245736 | A1 * | 11/2006 | Affaki ............................. | 386/109 |
| 2007/0044132 | A1 * | 2/2007 | Kubo et al. ..................... | 725/116 |
| 2008/0060001 | A1 * | 3/2008 | Logan et al. .................... | 725/34 |

(Continued)

FOREIGN PATENT DOCUMENTS

| | | | | |
|---|---|---|---|---|
| JP | 2000-278631 | 10/2000 | ............... | H04N 5/76 |
| KR | 2000-278631 | 10/2000 | ............... | H04N 5/76 |

(Continued)

*Primary Examiner* — Tat Chio
(74) *Attorney, Agent, or Firm* — Cha + Reiter, LLC.

(57) ABSTRACT

A streaming content management apparatus and method for recording and replaying video and audio data using a real time video indexing function are provided. A streaming content management apparatus of a multimedia broadcast receiver includes a recording unit for recording an incoming content stream in units of segment together with indexes and a player for replaying the content stream recorded by the recording unit in response to an index that is input to request playback from a segment corresponding to the input index. The streaming content management apparatus divides the streaming content incoming through a broadcast channel in units of segment and stores segments of the streaming content with storage index and chapter information such that it is possible to quickly retrieve a playback position using the storage index or chapter information.

15 Claims, 4 Drawing Sheets

(56) References Cited

U.S. PATENT DOCUMENTS

2008/0092168 A1* 4/2008 Logan et al. .................. 725/44
2011/0041146 A1* 2/2011 Lewis ............................. 725/5

FOREIGN PATENT DOCUMENTS

| KR | 2003-96799 | 12/2003 | ............... H04N 5/93 |
| KR | 2004-107126 | 12/2004 | ............... H04N 5/76 |

* cited by examiner

STREAMING CONTENT MANAGEMENT APPARATUS AND METHOD

This application claims the benefit of the earlier filing date, pursuant to 35 USC 119, to that patent application entitled "STREAMING CONTENT MANAGEMENT APPARATUS AND METHOD," filed in the Korean Intellectual Property Office on Sep. 1, 2006 and assigned Serial No. 2006-84312, the contents of which are incorporated herein by reference.

CLAIM OF PRIORITY

This application claims the benefit of the earlier filing date, pursuant to 36 USC 119, to that patent application entitled "STREAMING CONTENT MANAGEMENT APPARATUS AND METHOD," filed in the Korean Intellectual Property Office on Sep. 1, 2006 and assigned Serial No. 2006-84312, the contents of which are incorporated herein by reference.

BACKGROUND OF THE INVENTION

1. Field of the Invention

The present invention relates to a streaming content management apparatus and method, and more particularly, to a management apparatus and method for recording and replaying video and audio data using a real time video indexing function.

2. Description of the Related Art

The term "time shifting" is known in the art as the recording of streaming information such as TV shows to storage media to be viewed at a time more convenient to the user. In recent years, the advent of the digital video recorder (DVR) has made time shifting easier, by using a program guide and recording shows onto a hard disk. Some DVRs have other possible time shifting methods, such as being able to start watching the recorded show from the beginning even if the recording is not yet complete.

A DVR typically includes non-volatile storage (e.g. a hard disk) that enables the user to record desired content. DVR's also offer control functionality, such as the ability to pause content that is currently being broadcast or to watch the content, while still in progress, from the point it was paused. The DVR plays back the content from storage, starting at the pause event, while continuing to record the currently-broadcast content. Additionally, the DVR may support other control functions, such as rewinding, or fast forwarding a stored program, and slow motion playback.

However, most of the conventional time shift-enabled streaming content management techniques do not provide an effective playback positioning function, but only pausing of a program that is currently being broadcast or replaying of the past content within a limited time period.

SUMMARY OF THE INVENTION

The present invention has been made in an effort to solve the above problems and provides additional advantages, by providing a streaming content management apparatus and method that are capable of facilitating playback positioning on the past content by adding indexing information to a recorded streaming content.

One aspect of the present invention is to provide a streaming content management apparatus and method that are capable of improving a playback positioning function by chaptering the content which is recorded in real time.

In accordance with an aspect of the present invention, the above and other objects are accomplished by a streaming content management apparatus of a multimedia broadcast receiver. The streaming content management apparatus includes a recording unit for recording an incoming content stream in units of segment together with indexes; and a player for replaying the content stream recorded by the recording unit in response to an index that is input to request playback from a segment corresponding to the input index.

Preferably, the segment is a time duration having a predetermined length.

Preferably, the segment is a chapter defined by a metadata included in the content stream.

Preferably, the recording unit includes a storage; a content management unit for generating indexes corresponding to the segments of the content stream; and a recorder for storing the content units into the storage with the indexes generated by the content management unit.

Preferably, the recording unit further includes an electronic program guide server for providing electronic program guide information on the content stream.

Preferably, the content management unit generates the indexes referring to the electronic program guide information.

Preferably, the recording unit further includes a streaming controller interposed between the recorder and the content management unit that adjusts a transmission rate and format of the content stream transmitted from the recorder to the content management unit.

Preferably, the recording unit further includes a metadata database for storing metadata and the indexes generated by the content management unit.

Preferably, the player receives the indexes of the content stream and the metadata from the metadata database.

In accordance with another aspect of the present invention, the above and other objects are accomplished by a streaming content management method for a multimedia broadcast receiver. The streaming content management method includes segmenting an incoming content stream in segment units; generating indexes corresponding to the segments; storing the content stream in the segment units of with the corresponding index; determining whether an index is input for playback; and starting a playback of the content stream from a segment corresponding to the index input for the playback.

Preferably, the segment is a time duration having a predetermined length.

Preferably, the segment is a chapter defined by a metadata included in the content stream.

Preferably, storing the content stream includes determining whether the content stream is an analog signal stream or a digital signal stream; generating indexes, if the content stream is an analog signal stream, by analyzing the content stream, encoding the content stream into a digital signal stream and storing the digital signal stream with the indexes.

Preferably, storing the content stream further includes storing, if the content stream is not an analog signal stream, the content stream as a digital signal stream, decoding the content stream into an analog signal stream and generating the indexes by analyzing the decoded analog signal stream.

Preferably, the streaming content management method further includes extracting metadata from the content stream.

Preferably, starting a playback of the content stream includes outputting the metadata corresponding to currently replaying segment.

Preferably, the metadata includes chapter information, highlight information, and text abstract information.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention.

Figure 1:
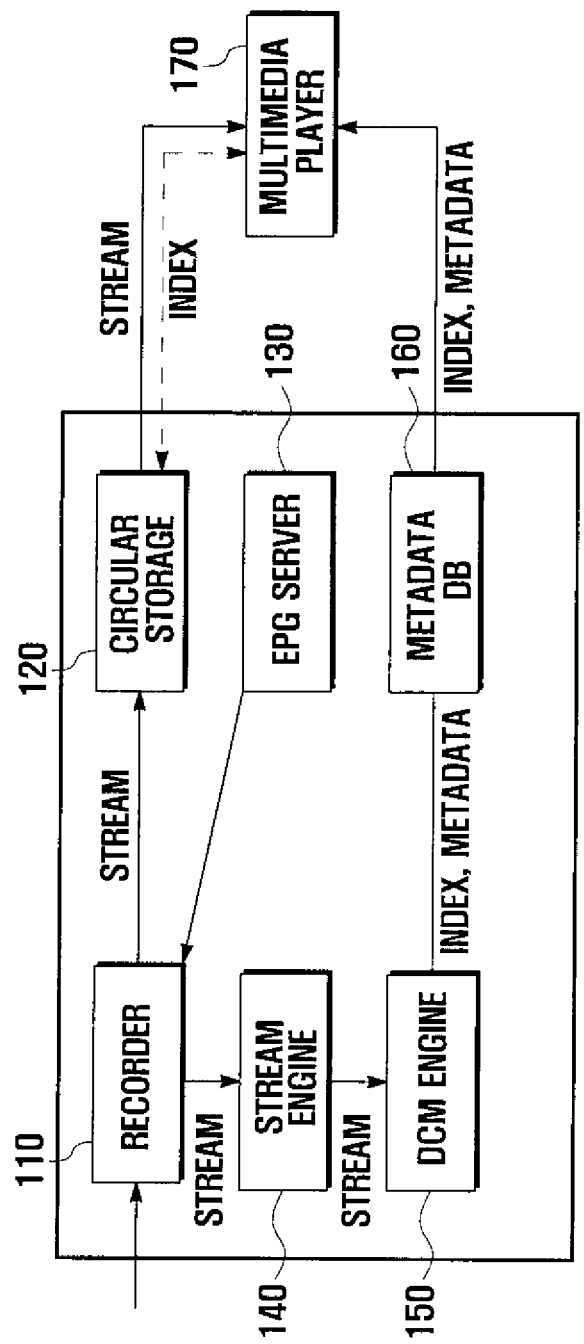
FIG. 1 is a block diagram illustrating a configuration of a streaming content management apparatus according to an exemplary embodiment of the present invention.

FIG. 1 is a block diagram illustrating a configuration of a streaming content management apparatus according to an exemplary embodiment of the present invention.

Referring to FIG. 1, the streaming content management apparatus according to an embodiment of the present invention includes a recorder 110, for recording analog or digital broadcast signals received through a cable or antenna, a circular storage 120, for buffering the broadcast signals recorded into the recorder 110, a digital content management (DCM) engine 150, for generating and assigning indexes to the broadcast signals, a stream engine 140, for controlling content stream transmitted from the recorder 110 to the DMC engine 150, an electronic program guide (EPG) server 130, for providing information for selecting an appropriate DCM entity from the DCM engine 150, a metadata database (DB) 160, for storing the indexes generated by the DCM engine 150, and a multimedia player 170, for collecting the indexes and metadata related to the content requested from the metadata DB 160 according to a content playback request and retrieving and outputting the content addressed by the index. The multimedia player 170 outputs the retrieved content together with the index and metadata associated with the content.

In this embodiment, the circular storage 120 and the DCM engine 150 are designed such that buffering the content stream and generating the indexes are performed in an asynchronous manner, in order to stably operate basic functions of the streaming content management apparatus irrelative to the operation of the DCM engine 150. The DCM engine 150 consists of a plurality of DCM entities such that an appropriate DCM entity is activated when the streaming content management apparatus is operating.

Figure 2:
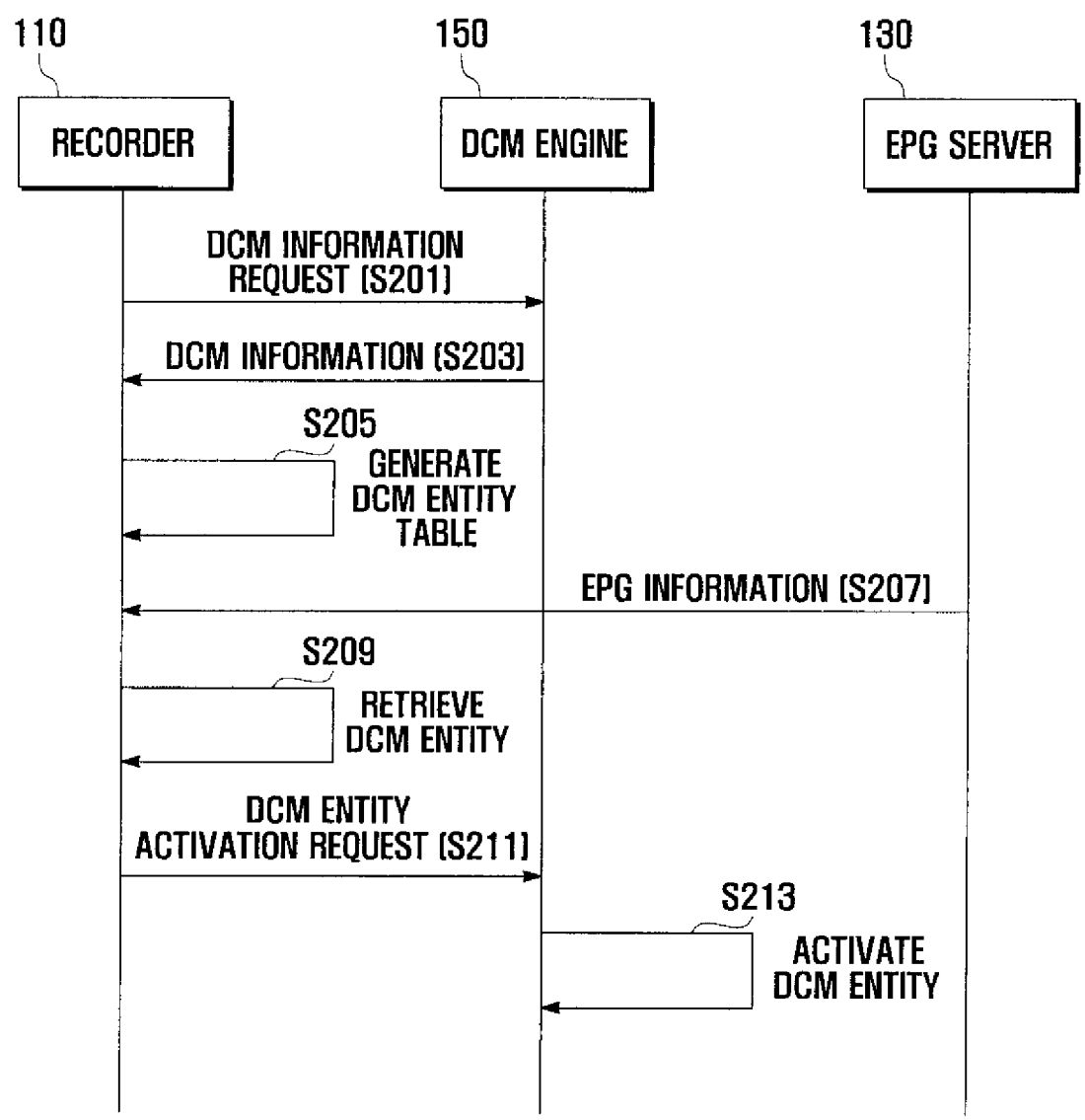
FIG. 2 is a message flow diagram illustrating a DCM engine activation mechanism of a streaming content management apparatus according to an exemplary embodiment of the present invention.

FIG. 2 is a message flow diagram illustrating a DCM engine activation mechanism of a streaming content management apparatus according to an exemplary embodiment of the present invention.

Referring to FIG. 2, the recorder 110 transmits a DCM entity information request to the DCM engine 150 for requesting information on DCM entities provided by the DCM engine 150 (S201). Upon receiving the DCM entity information request, the DCM engine 150 transmits DCM entity information to the recorder 110 in response to the DCM entity information request (S203). When the DCM entity information is received, the recorder 110 generates a DCM entity table on the basis of the received DCM entity information (S205). After generating the DCM entity table, the recorder 110 receives EPG information from the EPG server 130 (S207), and retrieves a DCM entity appropriate for a broadcast program from the DCM entity table on the basis of the received EPG information (S209). The recorder 110 then transmits a DCM entity activating request to the DCM engine 150 (S211). Upon receiving the DCM entity activation request message, the DCM engine 150 activates the DCM entity requested by the recorder 110 (S213). As shown in FIG. 2, the streaming content management apparatus is implemented so as to activate a DCM entity among the DCM entities provided by the DCM engine 150.

Figure 3:
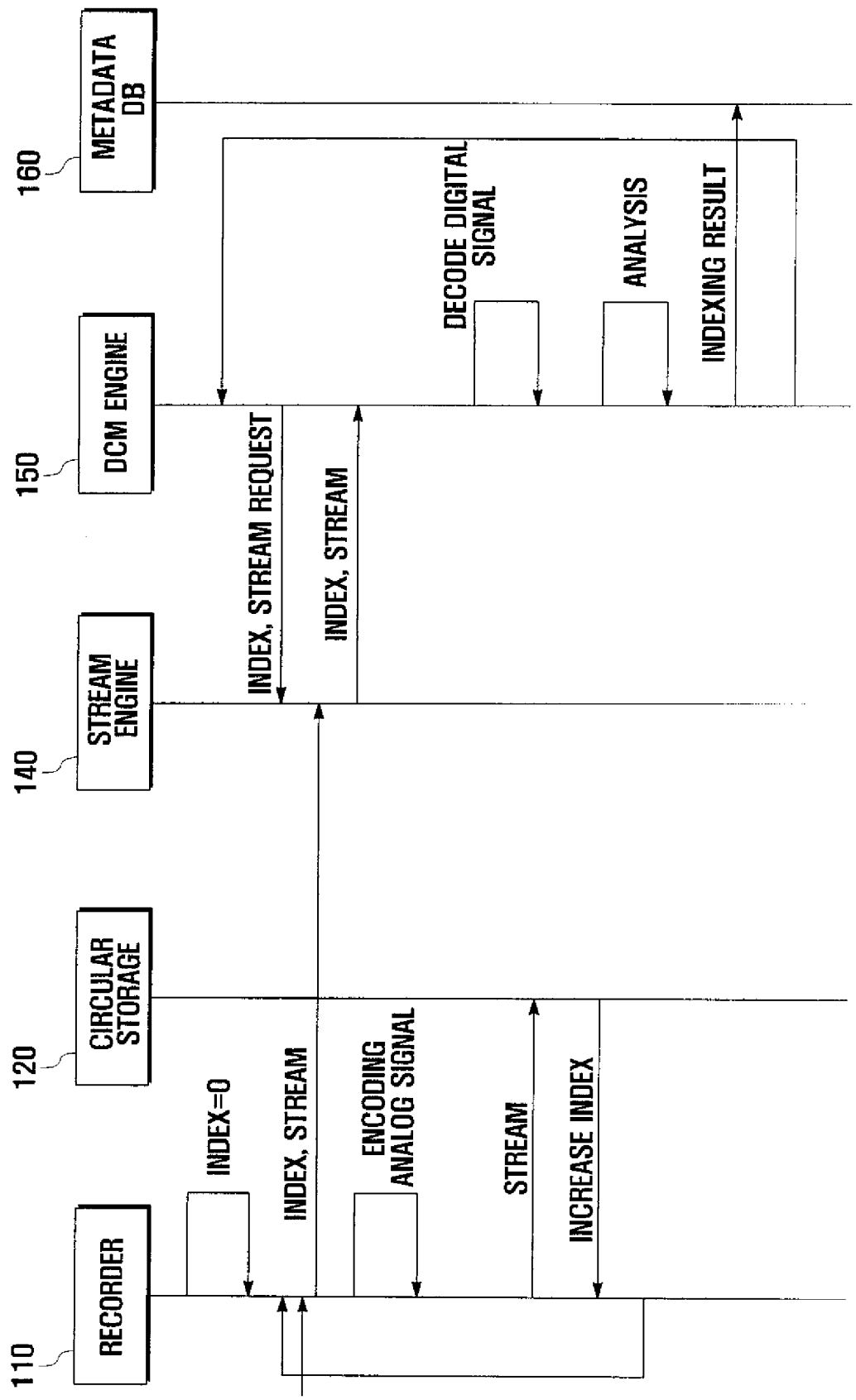
FIG. 3 is a message flow diagram illustrating a digital video recording procedure of a streaming content management apparatus according to an exemplary embodiment of the present invention.

FIG. 3 is a message flow diagram illustrating a digital video recording procedure of a streaming content management apparatus according to an exemplary embodiment of the present invention.

Referring to FIG. 3, the recorder 110 is provided with an initial index set to 0. The recorder 110 stores the content stream input through a TV input device (not shown) into the circular storage 120 and enables the DCM engine 150 to activate an appropriate entity on the basis of the EPG information received from the EPG server 130. If the DCM engine 150 activates the selected DCM entity, the recorder 110 copies a part of the content stream and forwards the copied part to the DCM engine 150 while storing the content stream into the circular storage 120. In the case that an analog broadcast signal is input, the recorder 110 converts the analog broadcast signal into a digital broadcast signal before storing the signal into the circular storage 120. The content stream received by the DCM engine 150 is an analog stream, such that the DCM engine 150 analyzes the analog stream without additional decoding process.

In the case that the input stream is a digital TV stream, the recorder 110 stores the digital TV stream into the circular storage 120 without an encoding process and forwards the identical digital TV stream to the DCM engine 150. When receiving the digital TV stream, the DCM engine 150 analyzes the stream after performing a decoding process on the received digital TV stream.

When the recorder 110 and the DCM engine 150 operate simultaneously, the recorder 110 shares address information of the stored stream with the DCM engine 150. This is because the DCM engine 150 should make the index generated through the stream analysis equal to the index of the stream stored by the recorder 110. For this purpose, the DCM engine 150 and the recorder 110 can be operated with a system time sharing mechanism or a byte index sharing mechanism that shares the byte information of the circular storage 120. Such an index synchronization mechanism can be selected on the basis of a stream processing scheme of the multimedia player 170, since the multimedia player 170 accesses the circular storage 120 using the index information generated by the DCM engine 150. For analysis of the access address of the circular storage 120, the multimedia player 170 preferably exploits the byte index sharing mechanism. If the multimedia player 170 is a local player that directly decodes the encoded stream, the multimedia player 170 can calculate the address of a stored content using a storing time. However, in the case of a streaming server that provides a content stream to remote client devices and does not support a decoding function, it is impossible to calculate the address of a stored content.

The recorder 110 retrieves the DCM entity and activates the retrieved DCM entity as follows.

The recorder 110 scans the DCM entities provided by the DCM engine 150 to collect the information on the DCM entities. The DCM engine 150 includes a plurality of DCM entities having different media types (video, audio, video/audio, still image, text, etc.) and different metadata types (chapter information, highlight information, text abstract, etc.). The recorder 110 manages the DCM entity table using the DCM entity information and selects a DCM entity appropriate for the corresponding stream content using the DCM information.

The stream engine 140 for exchanging the stream between the recorder 110 and the DCM engine 150 transmits the content stream from the recorder 110 to the DCM engine 150 at an appropriate rate and format. When the data processing speed of the recorder 110 is different to that of the DCM engine 150, the operation of the recorder 110 has a higher priority for disturbing the recording process. That is, the stream engine 140 can control the DCM engine 150 to be in a waiting state when there is no data to transmit to the DCM engine. However, when the recorder 110 is waiting for a data input, the control is handed over to the recorder 110 such that the recorder 110 determines whether to re-input or to discard a stream.

Figure 4:
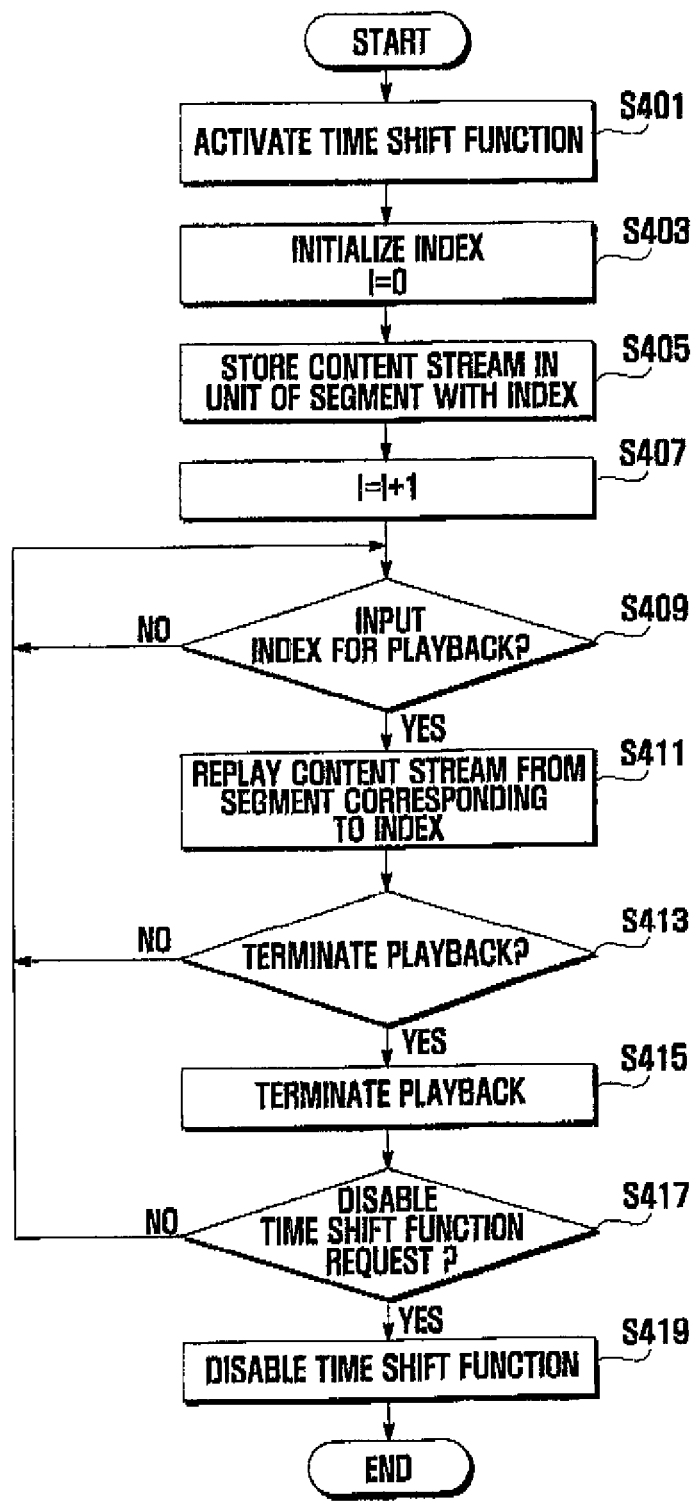
FIG. 4 is a flowchart illustrating a streaming content management method according to an exemplary embodiment of the present invention.

FIG. 4 is a flowchart illustrating a streaming content management method according to an exemplary embodiment of the present invention.

Referring to FIG. 4, the streaming content management apparatus according to an embodiment of the present invention monitors a signal input for activating a time shift function (S401). When a time shift function activation signal is input, the streaming content management apparatus sets a storage index i to 0 (S403). Next, the streaming content management apparatus stores incoming streaming content in units of segment (S405) and increases the storage index by 1 (S407).

While storing the content stream, the streaming content management apparatus determines whether a storage index is input for playback (S409). If a storage index is input, the streaming content management apparatus starts playback of the stored streaming content from a position corresponding to the input storage index (S411). The streaming content management apparatus continues to store the incoming streaming content even while the stored part of the streaming content is replayed.

During the playback of the stored part of the streaming content, the streaming content management apparatus determines whether a playback termination request signal is input (S413). If a playback termination request signal is input, the streaming content management apparatus terminates the playback of the streaming content (S415). Preferably, the streaming content management apparatus starts playback of a currently incoming part of the streaming content immediately upon termination of the playback of the stored part of the streaming content.

Upon termination of the playback of the stored part of the streaming content, the streaming content management apparatus determines whether a time shift function termination request signal is input (S417). If a time shift function termination request signal is input, the streaming content management apparatus disables the time shift function and terminates storing the streaming content (S419). Preferably, the stored part of the streaming content is discarded when the time shift function is disabled.

The above-described methods according to the present invention can be realized in hardware or as software or computer code that can be stored in a recording medium such as a CD ROM, an RAM, a floppy disk, a hard disk, or a magnetic and/or optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail, it should be clearly understood that many variations and/or modifications of the basic inventive concepts herein taught which may appear to those skilled in the present art will still fall within the spirit and scope of the present invention, as defined in the appended claims.

As described above, the streaming content management apparatus divides the streaming content incoming through a broadcast channel in units of segment and stores segments of the streaming content with storage index and chapter information such that it is possible to quickly retrieve a playback position using the storage index or chapter information.

Also, the streaming content management apparatus associates index information of a streaming content in recording with metadata generated on the basis of an electronic program guide information, thereby enabling provision of additional information related to a retrieved playback position such as chapter information, highlight information, and text abstract.

What is claimed is:

1. A streaming content management apparatus of a multimedia broadcast receiver, comprising:
    a recording unit for recording an incoming content stream in units of segment together with indexes, the recording unit including a storage for storing the incoming content stream;
    a metadata database for storing indexes and metadata;
    a content management unit for generating the indexes corresponding to a unit of segment having a predetermined length of the incoming content stream and the metadata and storing the indexes and metadata in the metadata database,
    a stream engine for controlling transmission of the incoming content stream from the recording unit to the content management unit to generate the indexes at a rate in accordance with a recording rate in which the recording unit stores the incoming content stream in the storage, wherein when the content management unit includes a processing speed different than the recording unit and the transmission of the incoming content stream from the recording unit terminates, the stream engine causes the content management unit to execute a waiting state; and
    a player comprising a processor for collecting the indexes and metadata related to content requested from the metadata database according to a content playback request, and replaying a stored part of the incoming content stream, addressed by an index stored in the metadata database, wherein playback of a currently incoming part of the incoming content stream is initiated when playback of the stored part of the incoming content stream is terminated.

2. The streaming content management apparatus of claim 1, wherein the segment is a time duration having a predetermined length.

3. The streaming content management apparatus of claim 1, wherein the segment is a chapter defined by a metadata included in the incoming content stream.

4. The streaming content management apparatus of claim 1, wherein the recording unit further comprises:
an electronic program guide server for providing electronic program guide information on the incoming content stream.

5. The streaming content management apparatus of claim 4, wherein the content management unit generates the indexes referring to the electronic program guide information.

6. The streaming content management apparatus of claim 1, wherein the recording unit further comprises:
a streaming controller interposed between the recorder and the content management unit that adjusts a transmission rate and format of the incoming content stream transmitted from the recorder to the content management unit.

7. The streaming content management apparatus of claim 1, the processor further:
after playback of the stored part of the incoming content stream is terminated, in response to a request to terminate a time shift function, terminating recording the incoming content stream and deleting the stored part of the incoming content stream.

8. The streaming content management apparatus of claim 1, wherein the recorder unit and the content management unit share address information of the stored part of the incoming content stream to synchronize the recording unit recording the incoming content stream in the units of segment together with the indexes, and the content management unit generating the indexes.

9. A streaming content management method for a multimedia broadcast receiver, the receiver comprising a processor for executing the steps of:
segmenting an incoming content stream into segment units and storing the segmented content stream in storage;
generating indexes corresponding to the segmented content stream according to the segment units and storing the generated indexes in a metadata database,
when a rate of segmenting the incoming content stream and storing the segmented content stream is different than a rate of generating indexes, periodically pausing generating the indexes such that the rate of generating indexes is in accordance with the rate of segmenting the incoming content stream and storing the segmented content stream;
detecting a content playback request including an index; and
retrieving an index from the metadata database corresponding to the index of the content playback request;
playing, from the storage, the stored segmented content stream in units according to the index of the content playback request; and
playing a currently incoming part of the incoming content stream when playback of the stored segmented content stream terminates.

10. The streaming content management method of claim 9, wherein the segment is a time duration having a predetermined length.

11. The streaming content management method of claim 9, wherein the segment is a chapter defined by a metadata included in the incoming content stream.

12. The streaming content management method of claim 9, wherein storing the segmented content stream further comprises:
determining whether the incoming content stream is an analog signal or a digital signal stream;
generating, indexes by analyzing the incoming content stream of an analog signal;
encoding the incoming content stream into a digital signal stream; and
storing the digital signal stream with the indexes.

13. The streaming content management method of claim 12, wherein storing the content stream further comprises:
storing the segmented content stream as a digital signal stream;
decoding the segmented content stream into an analog signal; and
generating the indexes by analyzing the decoded analog signal.

14. The streaming content management method of claim 12, wherein the metadata comprises chapter information, highlight information, and text abstract information.

15. The streaming content management method of claim 12, further comprising:
converting a determined digital signal stream into an analog signal.

* * * * *